（12) United States Patent
Igarashi et al.

(10) Patent No.: US 7,473,479 B2
(45) Date of Patent: Jan. 6, 2009

(54) CURRENT LIMITING SYSTEM AND CURRENT LIMITING METHOD FOR FUEL CELLS

(75) Inventors: Daishi Igarashi, Saitama-ken (JP); Kenichiro Kimura, Saitama-ken (JP); Yoshikazu Murakami, Saitama-ken (JP); Chihiro Wake, Saitama-ken (JP); Kenichiro Ueda, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 540 days.

(21) Appl. No.: 11/019,503

(22) Filed: Dec. 21, 2004

(65) Prior Publication Data

US 2005/0142396 A1 Jun. 30, 2005

(30) Foreign Application Priority Data

Dec. 26, 2003 (JP) ............................. 2003-435776

(51) Int. Cl.
*H01M 8/04* (2006.01)
*H01M 8/00* (2006.01)

(52) U.S. Cl. .................... 429/22; 429/23; 429/13; 700/297

(58) Field of Classification Search ................... 429/22, 429/23, 21, 13; 700/293, 292, 297, 266; 702/58, 64
See application file for complete search history.

(56) References Cited

U.S. PATENT DOCUMENTS

2006/0228602 A1* 10/2006 Takashita et al. .............. 429/23

FOREIGN PATENT DOCUMENTS

JP 07-272736 10/1995

* cited by examiner

*Primary Examiner*—Raymond Alejandro
(74) *Attorney, Agent, or Firm*—Lahive & Cockfield, LLP; Anthony A. Laurentano, Esq.

(57) ABSTRACT

A current limiting system for fuel cells includes a target current limit value setting device which sets a target current limit value for limiting the generated current taken out from the fuel cell stack in accordance with the cell voltage, and a current limit value setting device which sets a current limit value by replacing a present current limit value with the target current limit value when a difference between the present current limit value and the generated current value becomes smaller than a first predetermined value. The system also includes an output device which outputs the current limit value either to a current limiter for limiting the generated current in accordance with the current limit value or to an electric power consumption controller for controlling electric power consumption of loads that consume the generated current.

8 Claims, 7 Drawing Sheets

CURRENT LIMITING SYSTEM AND CURRENT LIMITING METHOD FOR FUEL CELLS

BACKGROUND OF THE INVENTION

The present invention relates to a current limiting system and a current limiting method for fuel cells, for limiting electric current generated by a fuel cell stack in accordance with an electricity-generation condition of the fuel cell stack.

Fuel cell includes a solid polymer electrolyte membrane sandwiched between a hydrogen pole at one side of the membrane and an oxygen pole at the other side of the membrane to provide a membrane electrode assembly (MEA), which is further sandwiched between conductive separators to form a single cell. Several tens or several hundreds of single cells are stacked to form a fuel cell stack. In order to generate electricity stably and constantly in this kind of fuel cell stack, the fuel cell stack has to be driven under a certain constant temperature, for example, at 80° C., and as disclosed in Japanese Laid-open Patent Application No. 7-272736 (paragraphs [0019] and [0020]), all the cell voltages are monitored and current limitation is performed in consideration of the lowest cell voltage such that the output voltage (cell voltage) of any one of these single cells does not become lower than a predetermined threshold value. In the case where the temperature of the fuel cell stack is lower than a predetermined temperature at the time of operation of the fuel cell stack, or in the case where the solid polymer electrolyte membrane is not sufficiently humidified to a predetermined humidified state and the ion conductivity has been deteriorated, the electricity generating efficiency deteriorates and the cell voltage of each single cell often lowers accordingly. While the cell voltage has been lowering, if generated electric current is taken out as much as in the case of the normal state where a decrease in cell voltage has not been occurred, the fuel cell stack becomes unstable, resulting a further decrease in the cell voltage or a deterioration of the solid polymer electrolyte membrane which ends in deteriorated durability of the fuel cell stack.

As to the problem regarding durability of the fuel cell stack, it may be solved by the technique disclosed in the Japanese Laid-open Patent Application No. 7-272736, in which the current limit value is set in accordance with the lowest cell voltage to limit the generated current. However, in this technique, notwithstanding the amount of generated electricity taken out from the fuel cell stack, the current control is carried out by changing the current limit value as soon as the lowest cell voltage varies. Therefore, even if the amount of generated current is so small, which is not required to limit the generated current, the current limit value is frequently renewed. Such unnecessary operations often make the control of the fuel cell stack unstable.

In view of the above, the present invention seeks to provide a current limiting system and a current limiting method for fuel cells, which enable a control in accordance with cell voltages of the fuel cell stack, and which contribute to a stable control for generating electricity at the fuel cell stack while eliminating unnecessary operations.

SUMMARY OF THE INVENTION

According to a first aspect of the present invention, there is provided a current limiting system for fuel cells, which limits electric current generated by a fuel cell stack including a plurality of single cells generating electricity by a chemical reaction between fuel gas and oxidant. The current limiting system includes: a cell voltage detector which detects a cell voltage of each single cell; a current detector which detects a generated current taken out from the fuel cell stack; an input device through which are inputted the cell voltage detected by the cell voltage detector and a generated current value detected by the current detector; a target current limit value setting device which sets a target current limit value for limiting the generated current taken out from the fuel cell stack in accordance with the cell voltage; a current limit value setting device which sets a current limit value by replacing a present current limit value with the target current limit value when a difference between the present current limit value and the generated current value becomes smaller than a first predetermined value; and an output device which outputs the current limit value either to a current limiter for limiting the generated current taken out from the fuel cell stack in accordance with the current limit value or to an electric power consumption controller for controlling electric power consumption of loads that consume the generated current.

According to a second aspect of the present invention, there is provided a method of limiting electric current generated by a fuel cell stack, which includes a plurality of single cells generating electricity by a chemical reaction between fuel gas and oxidant. The method includes the steps of: inputting a cell voltage that is detected by a cell voltage detector for detecting a cell voltage of each single cell and a generated current value that is detected by a current detector for detecting a generated current taken out from the fuel cell stack; setting a target current limit value for limiting the generated current taken out from the fuel cell stack in accordance with the cell voltage; setting a current limit value by replacing a present current limit value with the target current limit value when a difference between the present current limit value and the generated current value becomes smaller than a first predetermined value; and outputting the current limit value either to a current limiter for limiting the generated current taken out from the fuel cell stack in accordance with the current limit value or to an electric power consumption controller for controlling electric power consumption of loads that consume the generated current.

With these current limiting system and current limiting method, unnecessary operations such as for varying the current limit value can be eliminated when the difference between the current limit value and the generated current value is large. When the difference between the current limit value and the generated current value becomes small, the current limit value is varied.

With these current limiting system and current limiting method, while carrying out a control in accordance with the cell voltage of the fuel cell stack, unnecessary operations can be eliminated to contribute to a stable electricity-generation control for the fuel cell stack.

In the above current limiting system and current limiting method, limiting the electric current may be released when the cell voltage becomes greater than a second predetermined value.

With these current limiting system and current limiting method, if the generated current value becomes closer to the current limit value during the current limiting process, it is determined that the electricity-generation performance of the fuel cell stack is shifting to a stable condition, thereby allowing the normal electricity-generation by releasing (alleviating) the current limiting process for the fuel cell stack.

Further, in the above current limiting system, the current limit value may be gradually changed based on electric current corresponding to the generated current value of the fuel cell stack, at least when the generated current value of the fuel cell stack is limited or when limiting the generated current value of the fuel cell stack is released. Also, the above current limiting method may further comprise the step of gradually changing the current limit value based on electric current corresponding to the generated current value of the fuel cell stack, either when the generated current value of the fuel cell stack is limited or when limiting the generated current value of the fuel cell stack is released.

With these current limiting system and current limiting method, an abrupt output change can be prevented by gradually changing the current limit during the limiting/recovery process of the generated current. This can prevent hunting of the fuel cell system. In the case where the fuel cell system is mounted on a vehicle, it is possible to decrease an awkward feel given to the driver because an abrupt output change can be prevented.

Other features and advantages of the present invention will be apparent from the following description.

BRIEF DESCRIPTION OF THE DRAWINGS

The aspects of the present invention will become more apparent by describing in detail illustrative, non-limiting embodiments thereof with reference to the accompanying drawings, in which.

DETAILED DESCRIPTION OF EXEMPLARY EMBODIMENTS OF THE INVENTION

With reference to the accompanying drawings, an embodiment of a current limiting system for fuel cells according to the present invention will be described.

Construction of Current Limiting System for Fuel Cells

Figure 1:
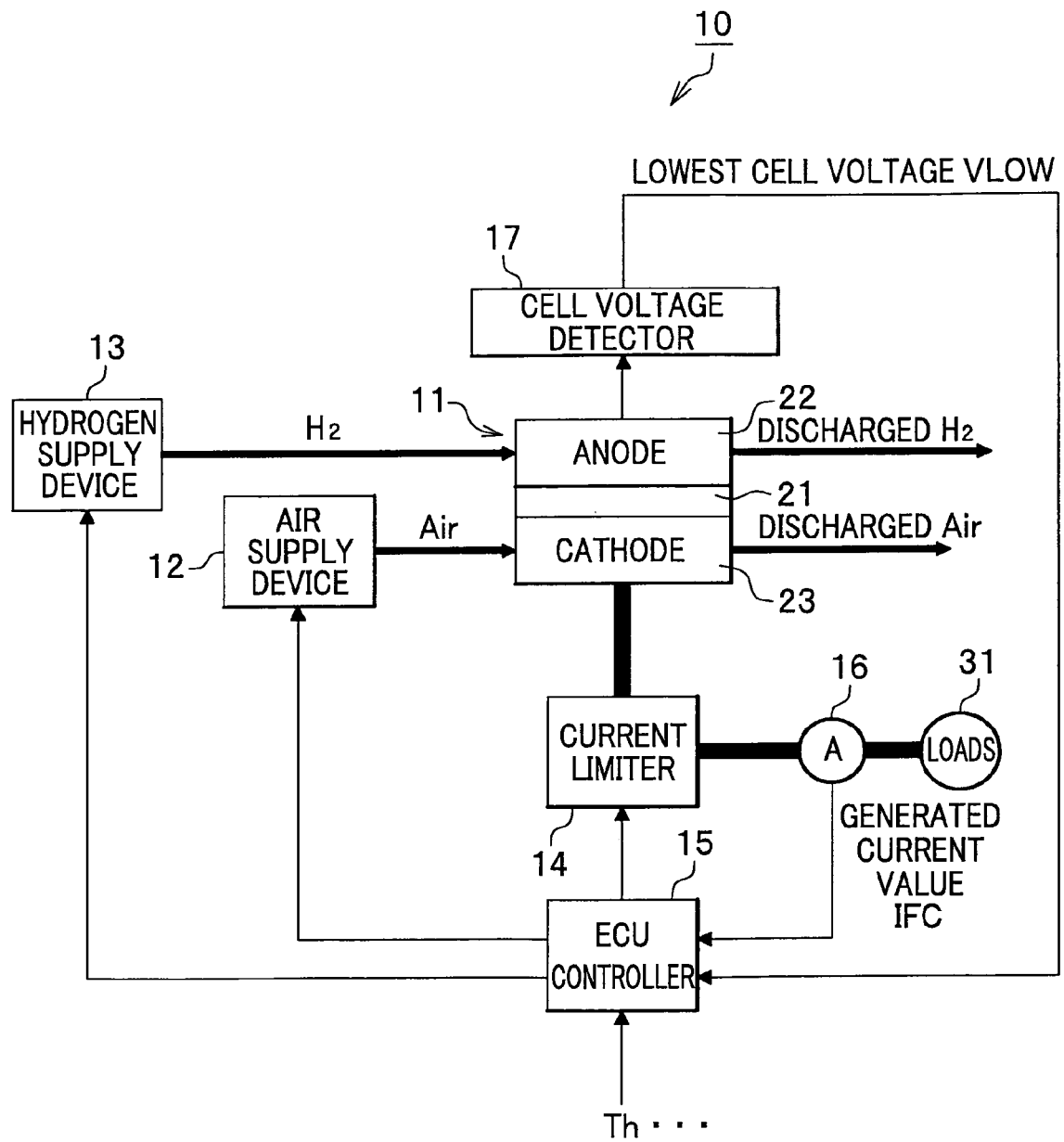
FIG. 1 is a block diagram illustrating the whole fuel cell system including a current limiting system according to the present invention.

As shown in FIG. 1, a fuel cell system 10 includes a fuel cell stack 11, an air supply device 12 for feeding air as an oxidant to the fuel cell stack 11, a hydrogen supply device 13 for feeding hydrogen as fuel to the fuel cell stack 11, a current limiter 14 for controlling an electric current (generated current value) taken out from the fuel cell stack 11, a controller 15 for controlling the overall fuel cell system 10, a current detector 16 for detecting the amount of electric current (generated current value) taken out from the fuel cell stack 11, and a cell voltage detector 17 for detecting a voltage (cell voltage) of each single cell of the fuel cell stack 11. This fuel cell system 10 is mounted on a vehicle (not shown).

In this embodiment, the current limiting system is incorporated in the controller 15.

The fuel cell stack 11 includes a solid polymer electrolyte membrane 21 with ion conductivity sandwiched between a hydrogen pole (anode) 22 coated by a catalyst and an oxygen pole (cathode) 23 coated by a catalyst to provide a membrane electrode assembly (MEA), which is in turn sandwiched between conductive separators (not shown) to form a single cell. A large number of these single cells (e.g. 200 single cells) are stacked transversely to form the fuel cell stack 11. A hydrogen passage, an air passage, and a coolant passage are formed in the separators. Air, hydrogen, and coolant are supplied to the fuel cell stack 11 respectively from the air supply device 12, the hydrogen supply device 13, and a coolant circulation device (not shown), so as not to be mixed together.

In this fuel cell stack 11, when the hydrogen supply device 13 feeds hydrogen to the hydrogen pole 22 and the air supply device 12 feeds air to the oxygen pole 23, electricity is generated by the electrochemical reaction between hydrogen and oxygen. This electrochemical reaction further proceeds by supplying loads 31 with electric current (generated current), namely by taking out electric current from the fuel cell stack 11, and the supply hydrogen and supply oxygen are consumed. In the case where electric current is not taken out from the fuel cell stack 11, the supply hydrogen and supply oxygen are not used in the fuel cell stack 11 and discharged therefrom (see discharged H2 and discharged Air). If the hydrogen supply device 13 is of the type using pure hydrogen stored in a hydrogen tank, etc, hydrogen (discharged H2) discharged from the fuel cell stack 11 is reused while being recirculated by an ejector, etc. In this embodiment, the hydrogen supply device 13 is provided with an ejector such that pure hydrogen fed from the hydrogen tank is circulated for the purpose of reuse.

Generated current taken out from the fuel cell stack 11 is inputted into the current limiter 14. The current limiter 14 is connected, for example, to electrical loads 31, such as a driving motor, the air supply device 12, and an air compressor motor (not shown) or to a capacitor (not shown) consisting of an electric double layer capacitor, etc. The current limiter 14 includes a DC/DC chopper, and limits the generated current taken out from the fuel cell stack 11 in accordance with a current limit command value (current limit value) outputted from the controller 15.

The controller 15 consists of a CPU (Central Processing Unit), a memory, an input/output interface (input device/output device), and other electric/electronic circuits, and functions to control the overall fuel cell system 10 and provides necessary functions required for the current limiting system according to this embodiment. Various signals or data, such as a throttle opening value transmitted from a throttle opening sensor of the throttle pedal (not shown), a generated current value transmitted from the current detector 16, a lowest cell voltage (VLOW) transmitted from the cell voltage detector 17 are inputted into the controller 15 through the input/output interface (not shown). The controller also functions to perform predetermined calculation processes based on the various signals or data to be inputted so as to set a target generation value of the fuel cell system 10, to set the rotation speed of the air compressor motor (not shown) of the air supply device 12, to set signals for performing ON/OFF of an electromagnetically operating shut valve (not shown) of the hydrogen supply device 13, and to set the current limit command value (current limit value) to be outputted to the current limiter 14. These signals or data are outputted to the corresponding devices through the input/output interface (not shown). The function for setting the current command value to be outputted to the current limiter 14, that is, the functions of the target current limit value setting device and the current limit value setting device are described later in detail with reference to flowcharts.

Figure 2:
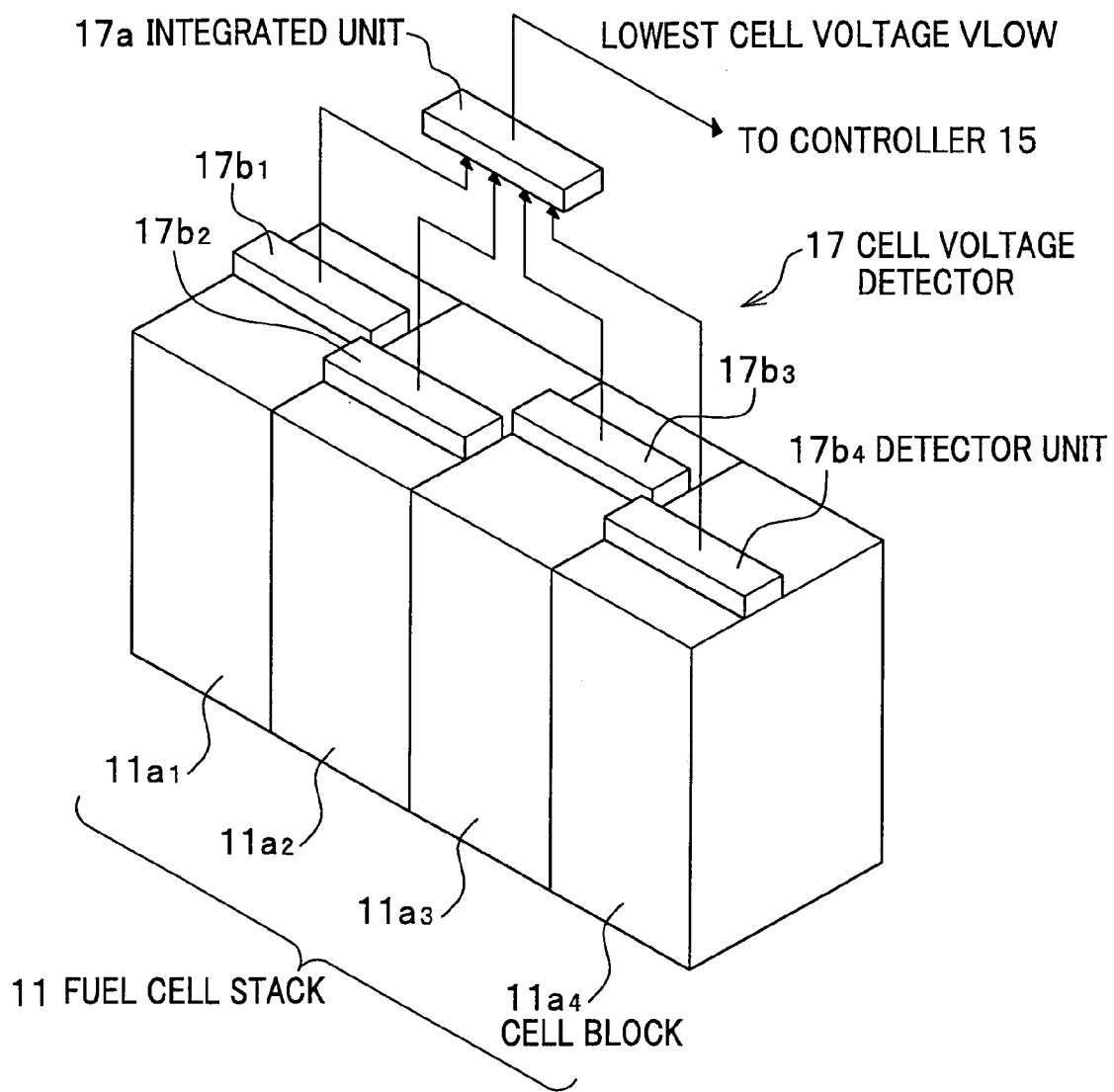
FIG. 2 schematically shows a fuel cell stack divided into several blocks and a cell voltage detector.

The cell voltage detector 17 detects cell voltages of a predetermined number of single cells contained in each cell block of the fuel cell stack 11. The fuel cell stack 11 consisting of, for example, 200 single cells is divided into a predetermined number of blocks, each containing, for example, 50 single cells. As shown in FIG. 2, the fuel cell stack 11 according to this embodiment is divided into four cell blocks such as shown by reference numerals 11a1 to 11a4. The cell voltage detector 17 consists of an integrated unit 17a and four detector units 17b1 to 17b4. The reason for dividing the detector unit 17b into four units is to ease assembly and disassembly of the fuel cell stack 11.

It should be noted that the reference numerals such as 17b1 and 17b2 are used for denoting an individual detector unit, and the reference numeral such as 17b is used for denoting the whole detector unit or for the case where an attention is not paid for an individual detector unit. The same can be said to the cell block. The reference numerals such as 11a1 and 11a2 are used for denoting an individual cell block, and the reference numeral such as 11a is used for the case where an attention is not paid for an individual cell block.

As seen in FIG. 2, the detector unit 17b is positioned on one side (top surface) of the fuel cell stack 11. The detector unit 17b1 scans 50 single cells of the cell block 11a1 and detects a cell voltage of each single cell. The detector unit 17b2 scans 50 single cells of the cell block 11a2 and detects a cell voltage of each single cell. The detector unit 17b3 scans 50 single cells of the cell block 11a3 and detects a cell voltage of each single cell. Also, the detector unit 17b4 scans 50 single cells of the cell block 11a4 and detects a cell voltage of each single cell. The number of single cells per cell block and the number of cell blocks are merely an example, and the present invention is not limited to these specific numbers.

As seen in FIG. 2, the integrated unit 17a is connected to the respective detector units 17b. Cell voltages scanned and detected by each detector unit 17b are inputted into the integrated unit 17a. The integrated unit 17a then processes to determine the lowest value (lowest cell voltage VLOW) of each cell block 11a and outputs the processing results to the controller 15.

In this embodiment, the detector units 17b1 to 17b4 in turn detects the corresponding cell voltages in a sequential manner such as in the order of the cell block 11a1, the cell block 11a2, the cell block 11a3, and the cell block 11a4. The detected values are sequentially outputted to the integrated unit 17a. The integrated unit 17a then determines the lowest cell voltage VLOW for each cell block 11a and outputs the same immediately to the controller 15. Input and output of the lowest cell voltage VLOW will be described later with reference to FIG. 6.

Because there are four detector units 17b, these four detector units 17b may simultaneously (parallelly) scan the corresponding cell block 11a to detect cell voltages. This can prevent a delay of control.

Operation of Current Limiting System

Operation of the current limiting system will be described below.

Setting Current Limit Value

Figure 3:
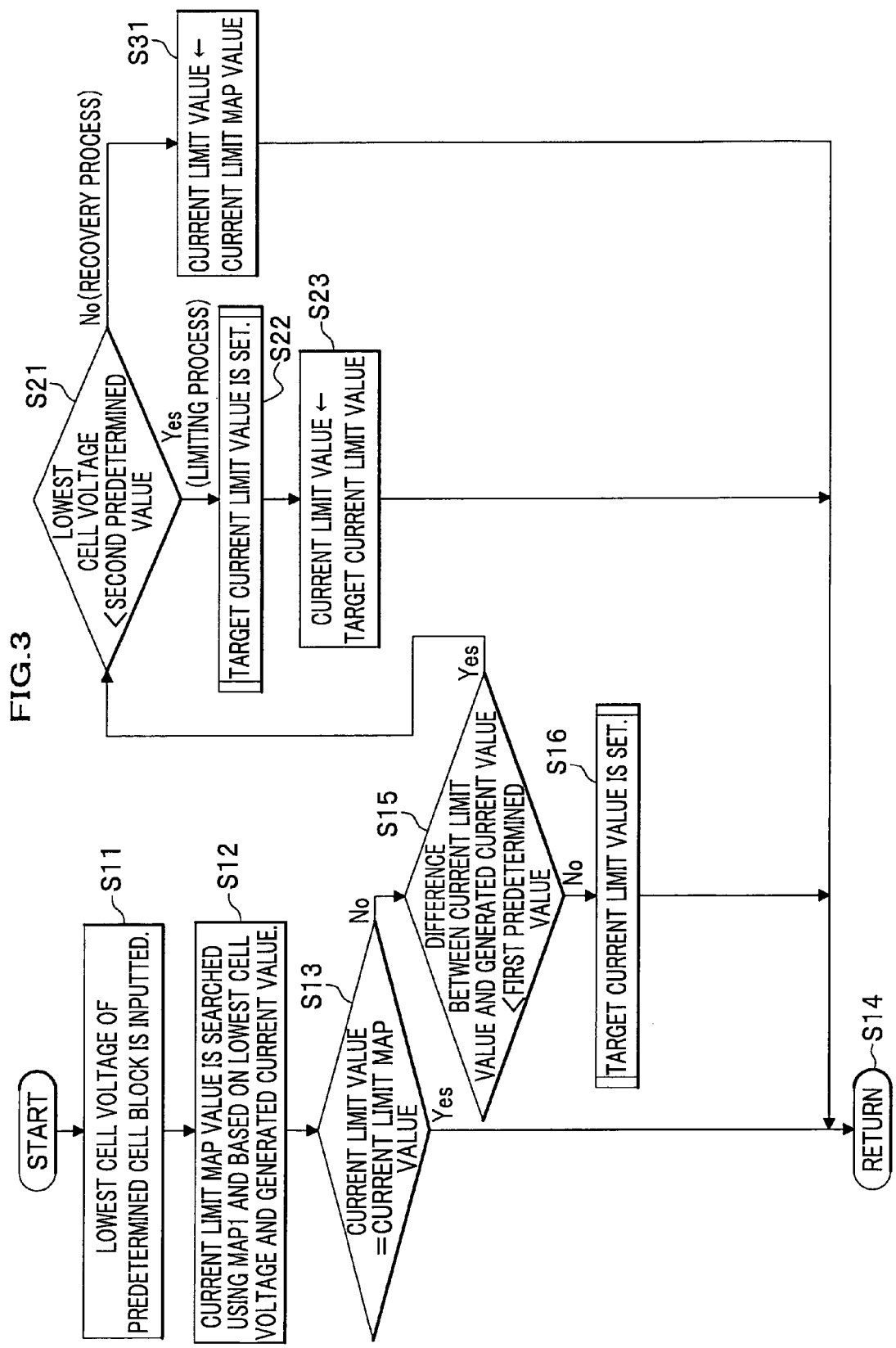
FIG. 3 is a flow chart showing a series of setting processes for setting the current limit value made by a controller.
Figure 4:
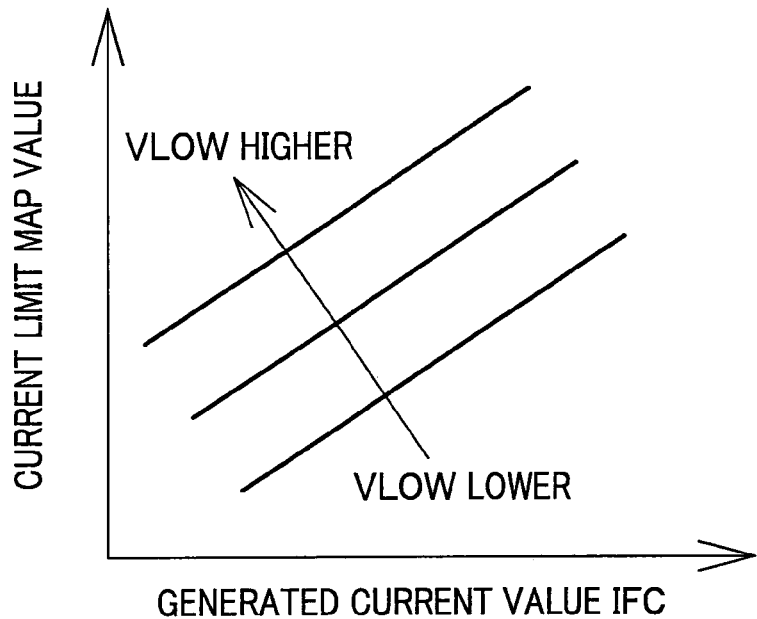
FIG. 4 schematically shows a current limit map for setting current limit map value based on generated current value and lowest cell voltage.

At first, a flow of setting the current limit value, namely function of the current limit value setting device, will be described with reference to the flow chart of FIG. 3. FIGS. 1, 2 and 4 may be referred to, if necessary. Here, the controller 15 actually operates as the current limiting system. FIG. 3 is a flow chart showing a series of setting processes for setting the current limit value made by a controller.

As shown in the flow chart of FIG. 3, the lowest cell voltage VLOW of the predetermined cell block 11a outputted from the cell voltage detector 17 and the generated current value IFC detected and outputted from the current limiter 16 are inputted into the controller 15 through the input/output interface (input device/output device) (not shown) (S11). The lowest cell voltage VLOW of the predetermined cell block 11a will be described later.

Based on the inputted lowest cell voltage VLOW and the generated current value IFC, the current limit map value is searched from the map of FIG. 4 (S12). The map shown in FIG. 4 is a three-dimensional map. It may be possible to calculate the current limit map value (pre current limit value) from a table or a function in place of the map.

The controller 15 then determines whether the present current limit value is the same as the current limit map value (S13). In step S13, if the present limit value is equal to the current limit map value (Yes), the controller 15 retains the present current limit value. The controller 15 then completes the process and proceeds to "RETURN" (S14).

Whenever "RETURN" is repeated in step S14, that is, every time the flow of this flow chart is completed, the present current limit value that has been set is outputted to the current limiter 14 as the current limit command value. According to this current limit command value, the current value (generated current value) taken out from the fuel cell stack 11 is limited. In this embodiment, because the current limit value is changed only when it is necessary, it is possible to prevent unstable operations of the current limiting system due to frequent changes of the current limit value (current command value).

Turning now to step S13, if the current limit value is not equal to the current limit map value (No), the controller 15 determines whether the difference between the current limit value and the generated current value inputted is smaller than a first predetermined value (S15). This step S15 is to determine whether the current limit value for limiting the generated current of the fuel cell stack 11 should be changed.

In step S15, if the difference between the current limit value and the generated current value is not smaller than the first predetermined value (No), the target current limit value is set by a subroutine in step S16. The subroutine for setting the target current limit value in step S16 will be described later.

When the target current limit value is set in step S16, the operation proceeds to "RETURN" (S14). In this case, although the target current limit value is set (changed), the same current limit value is retained. This is because, since the difference between the current limit value and the generated current value is large, there is no need to change the current limit value. Therefore, it is possible to omit such unnecessary operations of the controller 15 that the current limit value is frequently changed even if the limitation of the generated current is not required. This can lead to a stable control of the fuel cell stack 11 (fuel cell system 11). Meanwhile, the target current limit value is always changed to new one such that the change process of the current limit value can be carried out smoothly in case that the current limit value has to be changed.

The first predetermined value is set by experiments or simulations to such a value that the vehicle does not cause hunting even if the generated current abruptly changes.

Turning now to step S15, if the difference between the current limit value and the generated current value is smaller than the first predetermined value (Yes) in step S15, because the difference between the present current limit value and the present generated current value IFC is small, the operation proceeds to step S21 so as to carry out the process for changing the current limit value. For example, in the cases where the generated current value IFC becomes large or the current limit value becomes small, the difference between these values becomes smaller than the first predetermined value.

In step S21, the controller 15 determines whether the lowest cell voltage VLOW is equal to or larger than a second predetermined value. This step S21 is to determine either one of the process for limiting the current limit value or the process for recovering (alleviating) the current limit value should be carried out.

In step S21, if the lowest cell voltage is smaller than the second predetermined value (Yes; limiting process), the target current limit value is set in step S22. A subroutine for setting the target current limit value in step S22 will be described later. The second predetermined value is set to such a value that the fuel cell stack 11 drives in a stable condition.

In step S23, the target current limit value set by the previous step S22 (subroutine) is replaced with the present current limit value. As described later, in step S22, the target current limit value may be the same as the preceding target current limit value. In this case, the current limit value does not change and the same value is retained. After step S23 is completed, the operation proceeds to "RETURN" (S14). Therefore, the current limit value on the limiting process is changed, and at the same time, the current limit command value corresponding to the current limit value that has been changed is outputted from the controller 15 to the current limiter 14.

In step S21, if the lowest cell voltage is not smaller than the second predetermined value (No; recovery process), the current limit map value searched in step S12 is set as the current limit value (S31) In other words, the present current limit value is changed for the alleviating process. The operation then proceeds to "RETURN" (S14). Therefore, the current limit value on the recovery process is changed, and the current limit command value corresponding to the current limit value that has been changed is outputted from the controller 15 to the current limiter 14.

In this embodiment, in step S11 of the first routine (nth routine), it is the lowest cell voltage VLOW for the cell block 11a1 that is inputted as "the cell voltage of the predetermined cell block". To be more specific, of these cell voltages of 50 single cells detected by the detector unit 17b1, the cell voltage having the lowest value is inputted. Similarly, in step S11 of the second routine (2nth routine), it is the lowest cell voltage VLOW for the cell block 11a2 that is inputted as "the cell voltage of the predetermined cell block". In step S11 of the third routine (3nth routine), it is the lowest cell voltage VLOW for the cell block 11a3 that is inputted as "the cell voltage of the predetermined cell block". And in step S11 of the fourth routine (4nth routine), it is the lowest cell voltage VLOW for the cell block 11a4 that is inputted as "the cell voltage of the predetermined cell block".

In other words, the lowest cell voltage VLOW for the respective cell blocks 11a1 to 11a4 is in turn inputted at every routine, and the calculation process flow for calculating the current limit value is executed with each lowest cell voltage VLOW. This is particularly advantageous for quickly limiting the generated current as compared with the case where the generated current is limited after the detector units 17b1 to 17b4 detect all the cell voltages for the single cells of the fuel cell stack 11. For example, it is possible to execute at high speed the process for protecting the fuel cell stack 11.

Setting Target Current Limit Value

Figure 5:
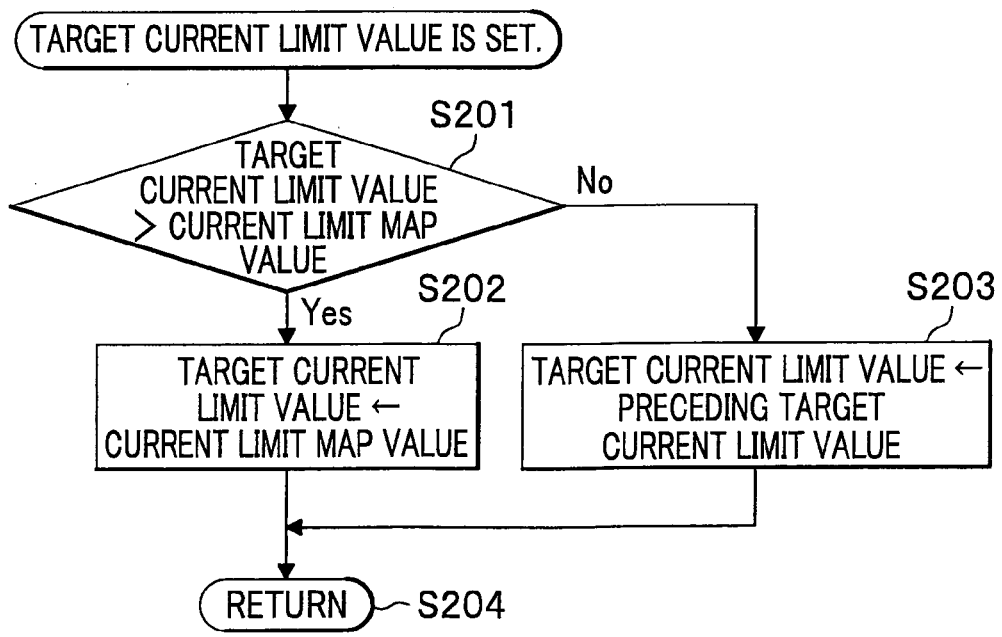
FIG. 5 is a flow chart showing a series of setting processes for setting the target current limit value made by the controller.

With reference to the flow chart of FIG. 5 (and FIGS. 1 to 4, if necessary), the flow for setting the target current limit value, namely the function of the target current limit value setting device defined in the claims, will be described. FIG. 5 is a flow chart showing a series of setting processes for setting the target current limit value made by the controller.

As seen in FIG. 5, in step S201, the controller 15 determines whether the target current limit value is larger (higher) than the current limit map value. In step S201, if the target current limit value is larger than the current limit map value (Yes), the current limit map value is set as the target current limit value (S202). Meanwhile, if the target current limit value is not larger than the current limit map value (No) in step S201, the preceding target current limit value is set as the target current limit value (S203). Therefore, the target current limit value retains the same value as the preceding target current limit value.

The target current limit value in step S201 is a target current limit value that is effective at present, and for example, the value set by the previous step S16 or the value set by the preceding step S201 is used. The value searched in step S12 is used as the current limit map value in step S201.

When the process in step S202 or the process in step S203 is completed, the operation proceeds to step S204 and completes the subroutine (RETURN).

Time Chart

Figure 6:
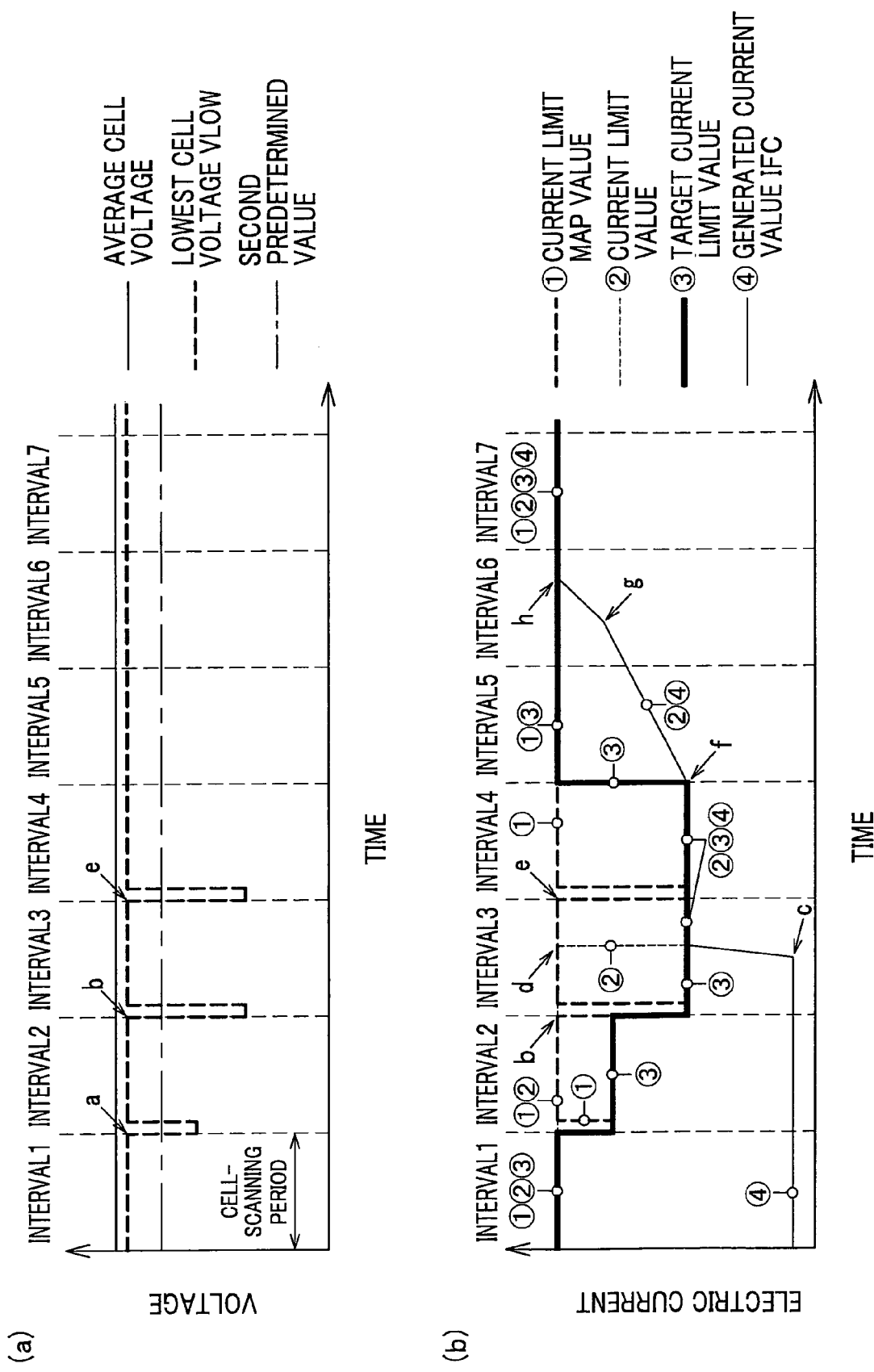
FIG. 6 shows time charts, in which (a) shows elapse of time and change in the average cell voltage and the lowest cell voltage; and (b) shows elapse of time and change in the generated current value, the current limit value, the target current limit value, and the current limit map value.

With reference to the time chart of FIG. 6 (and FIGS. 1 to 5, if necessary), operation of the current limiting system according to this embodiment will be described. The step numbers appearing below in the description correspond to those referred to in the flow chart shown in FIG. 3 or FIG. 5.

Herein, FIG. 6(a) is a time chart showing elapse of time and change in the average cell voltage and the lowest cell voltage. FIG. 6(b) is a time chart showing elapse of time and change in the generated current value, the current limit value, the target current limit value, and the current limit map value. These time charts are divided into several intervals, such as Interval 1, Interval 2, Interval 3, etc, for the purpose of explanation. In this embodiment, each interval has the same length of time as the cell-scanning period. The cell-scanning period is time that each detector unit 17b scans all the single cells of one cell block 11a and detects all the cell voltages. In the case of this embodiment where the fuel cell stack 11 is divided into four cell blocks 11a, four cell-scanning periods are required for detecting cell voltages for all the single cells of the fuel cell stack 11.

Description will now be given of the time chart.

Interval 1

At Interval 1 of FIG. 6(a) the average cell voltage and the lowest cell voltage VLOW are almost same. In other words, the fuel cell stack 11 drives in a stable condition. Further, at Interval 1 of FIG. 6(b) the generated current value IFC remains low. This is because the driver does not depress the throttle pedal and other reasons. Because the lowest cell voltage VLOW is close to the average cell voltage and the generated current value IFC (circled number 4 in the figure) is low, the current limit value (circled number 2 in the figure) shown by the thin broken line, the target current limit value (circled number 3 in the figure) shown by the thick solid line, and the current limit map value (circled number 1 in the figure) shown by the thick broken line indicate the same value. In other words, they are not limited.

At Interval 1, operations of step S11→step S12→step S13→step S14 are repeated.

Interval 2

As shown by the arrow a, at Interval 2 of FIG. 6(a) the lowest cell voltage VLOW lowers. It should be noted that this lowest cell voltage VLOW is not of Interval 2, but is of the preceding Interval 1 where a detection has been carried out for a plurality of single cells of the cell block 11a (e.g. cell block 11a1) to determine the lowest cell voltage. Based on the value of this lowest cell voltage VLOW, it can be understood that the fuel cell stack 11 is in an unstable condition.

At Interval 2 of FIG. 6(b), the generated current value IFC is still low. Therefore, the current limit value is retained at a high value (S15). This achieves a stable control. Meanwhile, as shown by the arrow b, the current limit map value takes a value according to the lowest cell voltage VLOW (S12). Although another target current limit value is newly set (S16), the same value is retained as the target current limit value because the current limit map value is larger (higher) than the target current limit value (step S201 and S203). As is apparent from FIG. 6(a), the same value is not always retained as the lowest cell voltage VLOW throughout one interval. Therefore, as shown in FIG. 6(b), the current limit map value takes a value according to the lowest cell voltage VLOW. However, the same value is retained as the target current limit value. This is because, in steps S201 and S203 of the subroutine, the same value has been retained as the target current limit value since the previous operation steps. Accordingly, even if the current limit map value changes with frequency, the target current limit value does not change frequently, thereby performing a stable control. Further, even if the fuel cell stack 11 is in an unstable condition, because the difference between the current limit value and the generated current value IFC is sufficiently large (the difference is greater than the first predetermined value), unnecessary control is not carried out, which leads to a stable electricity generation control of the fuel cell stack 11.

At Interval 2, operations of step S11→step S12→step S13→step S15→step S16 (step S201→step S203)→step S14 are repeated.

First Half of Interval 3

As seen in the first half of Interval 3 shown in FIG. 6(a), the lowest cell voltage VLOW becomes lower than that of Interval 2 (see Arrow b). As described previously, this lowest cell voltage VLOW is of the preceding interval (Interval 2) where a detection has been carried out for a plurality of single cells of the cell block 11a (e.g. cell block 11a2). Based on the value of this lowest cell voltage VLOW, it can be understood that the fuel cell stack 11 is still in an unstable condition.

As seen in the first half of Interval 3 shown in FIG. 6(b), the generated current value IFC is still low (S15). Therefore, the current limit value is retained at a high value. Meanwhile, the current limit map value takes a low value (S12). Further, a new target current limit value is set (S16). Because the control for the first half of Interval 3 is the same as for Interval 2, further explanation will be omitted.

Latter Half of Interval 3

Explanation will be given of the latter half of Interval 3 from the point shown by Arrow c of FIG. 6(b). For example, the driver depresses the throttle pedal at the point shown by Arrow c. Electric current (generated current) taken out from the fuel cell stack 11 is therefore increased. This makes the difference between the current limit value and the generated current value IFC smaller than the first predetermined value (S15). At this stage, because the lowest cell voltage is more than the second predetermined value, the operation in step S21 proceeds with the limiting process of step S22 and the target current limit value is set in step S22. Because in step S22 the target current limit value (preceding value) is higher than the current limit map value (S12), the preceding target current limit value is set as the target current limit value (S201, S203). And in step S23, the target current limit value set in step S22 is set as the current limit value (S23). Therefore, the current limit value (circled number 2) abruptly lowers as shown by Arrow d of FIG. 6(b).

In other words, according to this embodiment, limiting the electric current is carried out only when it is necessary.

Interval 4

As seen in Interval 4 and Arrow e of FIG. 6(a), the lowest cell voltage VLOW is as low as that of Interval 3. The definition of the lowest cell voltage VLOW has already been described above.

The reason why the decrease of the lowest cell voltage VLOW is restricted at Interval 4, that is, the reason why a further decrease of the lowest cell voltage VLOW continuously decreasing from Intervals 2 and 3 is restricted, is because the controller 15 makes the current limit value lower so that the generated current taken out from the fuel cell stack 11 is limited. This can protect the fuel cell stack 11. Although the threshold value for the lowest cell voltage VLOW is not shown in FIG. 6(a), it should be understood that the lowest cell voltage VLOW at Interval 3 and Interval 4 should be more than the threshold value in consideration of the subject matter of the present invention.

Interval 5

As seen in Interval 5 of FIG. 6(a), the lowest cell voltage VLOW becomes as high as the average cell voltage. This is because the cell voltage recovers, for example, by discharging the product water retained within the fuel cell stack 11 by means of purging, etc. As shown in FIG. 6(a), the lowest cell voltage VLOW recovers and takes a value that is higher than the second predetermined value.

Therefore, the generated current value IFC increases (Arrow f) as shown in FIG. 6(b). To be more specific, at Interval 5, "the difference between the current limit value and the generated current value is smaller than the first predetermined value" and "the lowest cell voltage is equal to or higher than the second predetermined value". At Interval 5, operations of step S11→step S12→step S13→step S15→step S21→step S31 are repeated.

During Interval 1 through Interval 4, even if the driver depresses the throttle pedal, the target current limit value (current limit value) is limited to a low value due to the decreased lowest cell voltage VLOW, which makes the generated current value IFC lower. However, because the fuel cell stack 11 recovers to the stable condition at Interval 5 and the lowest cell voltage VLOW recovers to a value as high as the original value, the controller 15 is allowed to set the target current limit value (current limit value) to a higher value. Accordingly, the target current limit value, the current limit value, and the generated current value IFC are all increasing at Interval 5 (see Arrow f).

Figure 7:
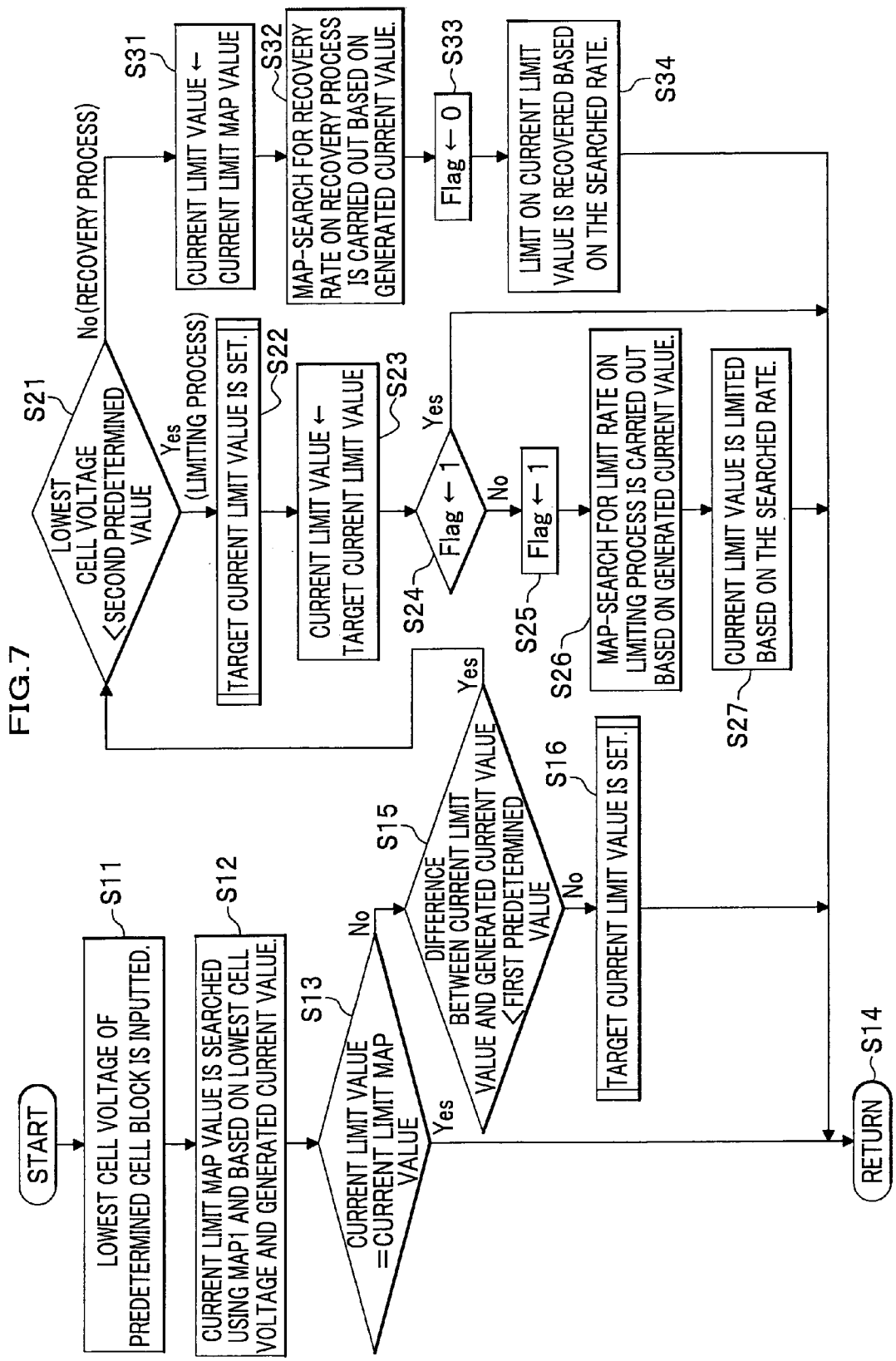
FIG. 7 is a flow chart showing a modified embodiment of FIG. 3.
Figure 8:
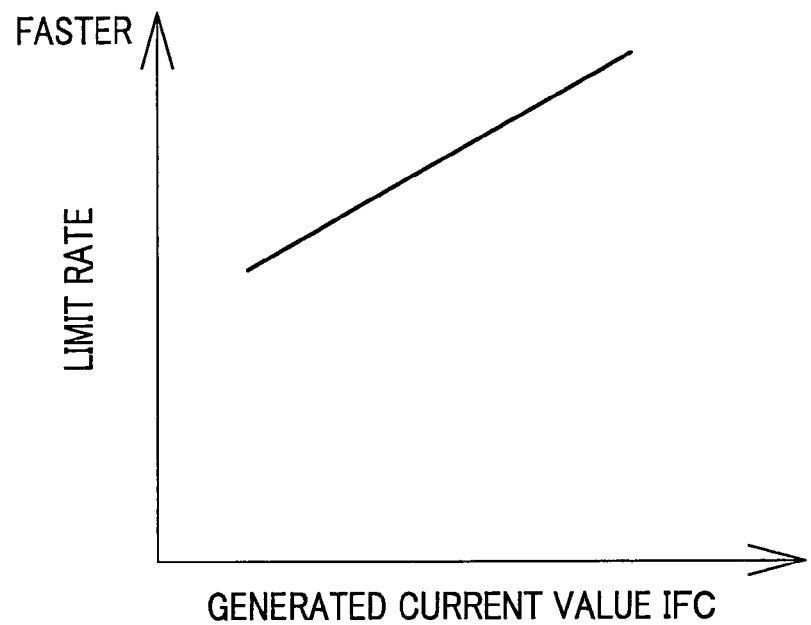
FIG. 8 is a map showing limit rate.
Figure 9:
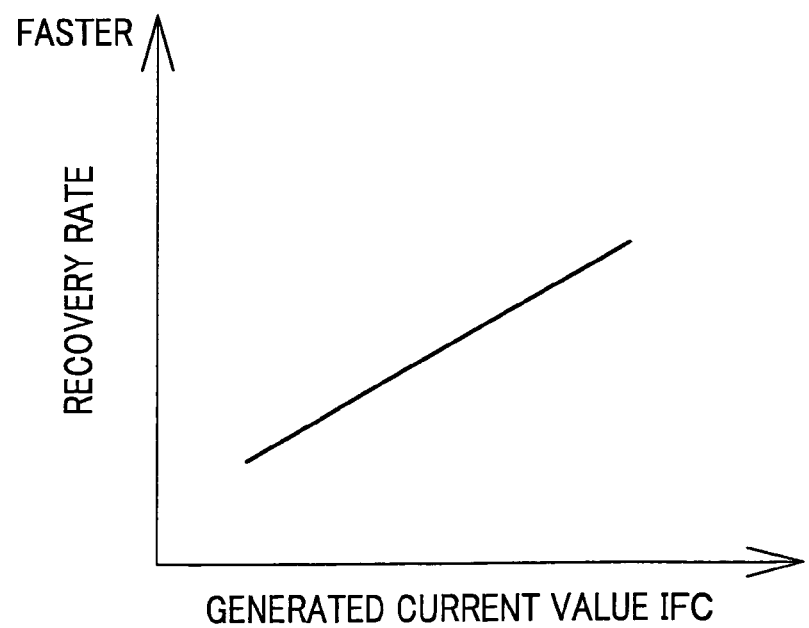
FIG. 9 is a map showing recovery rate.

At Arrow f of Interval 5, on the contrary to the target current limit value (circled number 3) which indicates an abrupt increase, the current limit value and the generated current value IFC (circled numbers 2 and 4) are increasing slowly. This is because operations shown by steps S32 to S34 of FIG. 7 (rate processes on the recovery process) are carried out after step S31 of FIG. 3. FIG. 7 is a flow chart showing a modified embodiment of FIG. 3, in which steps S32 to S34 and steps S24 to S27 (rate processes on the limiting process) are added to the flow chart of FIG. 3. The map of the limit rate is shown in FIG. 8. The map of the recovery rate is shown in FIG. 9. Flags shown in steps S24, S25, and S33 of FIG. 7 are for distinguishing whether the recovery rate control has been carried out.

FIG. 8 is a map showing limit rate, in which limit rate is faster as the generated current value IFC is higher, and limit rate is slower as the generated current value IFC is lower. This is for preventing an occurrence of a large change amount of electric current (generated current value IFC) for a short period of time. FIG. 9 is a map showing recovery rate, in which recovery rate is faster as the generated current value IFC is higher, and recovery rate is slower as the generated current value IFC is lower. This is also for preventing an occurrence of a large change amount of electric current for a short period of time. At Interval 5 and Interval 6 of FIG. 6(b), because the recovery rate is faster as the generated current value IFC is higher, the slopes showing increase (recovery) in the current limit value and the generated current value IFC become steep (see Arrow g).

This can allow a quick recovery (release) of the current limit with less awkward feel given to the driver. This can also be said to the limiting process. The limit rate is obtained using a map such as shown in FIG. 8 and the control is made based on this limit rate, so that a quick current limit is achieved with less awkward feel given to the driver. The limit rate may have a definition as an upper limit value (or a lower limit value) or a definition as a coefficient to be multiplied.

Interval 6

Control similar to Interval 5 is made at Interval 6. The driver further depresses the throttle pedal at Interval 6. At the point shown by Arrow h the output of the fuel cell stack 11 becomes the maximum.

Interval 7

Control similar to Interval 1 is made at Interval 7. To be more specific, because the current limit value and the current limit map value are the same in value, operations of step S11→step S12→step S13→step S14 are repeated.

Applicant (Assignee) of this application has filed a related application as Japanese Patent Application No.2002-347146 that is unpublished at the time of filing Japanese Patent Application No.2003-435776 on which the priority of this application is claimed. The contents of Japanese Patent Application Nos.2002-347146 and 2003-435776 are hereby incorporated by reference. Japanese Patent Application No.2003-347146 discloses to divide a fuel cell block into a plurality of cell blocks so that in the relation between the lowest cell voltage of each cell block and the generated current value, the output of the fuel cell stack wherein the lowest cell voltage does not lower than the threshold value is calculated as the current limit value, and to perform a feed-forward control of the generated current value in accordance with this current limit value. According to the embodiment of the present invention, the fuel cell stack 11 is also divided into a plurality of cell blocks 11a1 to 11a4, and the current limit control is performed based on the relation between the lowest cell voltage of each cell block 11a and the generated current value. Therefore, a delay of control for limiting electric current can be advantageously decreased. To be more specific, the controller disclosed in Japanese Laid-open Patent Application No.7-272736 determines the lowest cell voltage only after it detects the cell voltages of all the single cells of the fuel cell stack, thereby leading to a delay of control for limiting electric current. However, such a control delay can be eliminated according to the present invention. Further, according to the present invention, it is not necessary to frequently change the current limit value as compared with the above two prior art devices, leading to a stable control.

While the present invention has been described in detail with reference to specific embodiments thereof, it will be apparent to one skilled in the art that various changes and modifications may be made without departing from the scope of the claims. For example, it is not necessary to provide four detector units. One detector unit may detect the cell voltages of all the single cells and transmit all the detection data to the controller, so that the controller determines the lowest cell voltage for each cell block.

Also, the current limiter may control electric current on electric loads side instead of on the take-out side of generated current. For example, the current limiter may input the current limit value to an electric power consumption controller (motor controller) for controlling load of the drive motor, etc. which consumes generated current, so as to control the generated current on the electric loads side, for example, by limiting the rotation speed of the drive motor.

Further, in the above embodiment, the fuel cell stack is divided into four cell blocks each of which is detected to determine the lowest cell voltage, and the current limit value (target current limit value) is set in accordance with the respective lowest cell voltages. However, dividing the fuel cell stack into a plurality of cellblocks is not necessary to implement the present invention.

What is claimed is:

1. A current limiting system for fuel cells, which limits electric current generated by a fuel cell stack, the fuel cell stack including a plurality of single cells generating electricity by a chemical reaction between fuel gas and oxidant, the current limiting system comprising:
   a cell voltage detector which detects a lowest cell voltage amongst the plurality of single cells;
   a current detector which detects a current generated by the fuel cell stack;
   an input device through which are inputted the lowest cell voltage detected by the cell voltage detector and the generated current detected by the current detector;
   a target current limit value setting device which calculates a target current limit value for limiting the current generated by the fuel cell stack in accordance with the lowest cell voltage;
   a current limit value setting device which sets a current limit value to the target current limit value when a difference between the current limit value and the generated current becomes smaller than a first predetermined value; and
   an output device which outputs the current limit value either to a current limiter for limiting the current generated by the fuel cell stack in accordance with the current limit value or to an electric power consumption controller for controlling electric power consumption of loads that consume the generated current,
   wherein limiting the current generated by the fuel cell stack is released when the lowest cell voltage becomes greater than a second predetermined value,
   wherein the current limit value is gradually changed based on the current generated by the fuel cell stack when limiting the current generated by the fuel cell stack is released.

2. A current limiting system for fuel cells according to claim 1, wherein the current limit value is gradually changed when the current generated by the fuel cell stack is limited.

3. A current limiting system for fuel cells according to claim 1, wherein if the current limit value is equal to the presently calculated target current limit value, the current limiting system maintains the present current limit value.

4. A current limiting system for fuel cells according to claim 1, wherein in case that the lowest cell voltage is below the second predetermined value showing a stable generation of electricity by the fuel cell stack, the current limit value setting device sets the current limit value to the calculated target current value if the calculated target current value is smaller than the current limit value and maintains the current limit value if the calculated target current value is larger than the current limit value.

5. A method of limiting electric current generated by a fuel cell stack, which includes a plurality of single cells generating electricity by a chemical reaction between fuel gas and oxidant, the method comprising the steps of:

inputting a lowest cell voltage that is detected by a cell voltage detector amongst the plurality of single cells and a current that is generated by the fuel cell stack and detected by a current detector;

calculating a target current limit value for limiting the current generated by the fuel cell stack in accordance with the lowest cell voltage;

setting a current limit value to the target current limit value when a difference between the current limit value and the generated current becomes smaller than a first predetermined value; and outputting the current limit value either to a current limiter for limiting the current generated by the fuel cell stack in accordance with the current limit value or to an electric power consumption controller for controlling electric power consumption of loads that consume the generated current, wherein limiting the current generated by the fuel cell stack is released when the lowest cell voltage becomes greater than a second predetermined value, wherein the current limit value is gradually changed based on the current generated by the fuel cell stack when limiting the current generated by the fuel cell stack is released.

6. A method of limiting electric current according to claim 5, further comprising the step of gradually changing the current limit value when the current generated by the fuel cell stack is limited.

7. A method of limiting electric current according to claim 5, wherein if the current limit value is equal to the presently calculated target current limit value, the current limiting system maintains the present current limit value.

8. A method of limiting electric current according to claim 5, wherein in case that the lowest cell voltage is below the second predetermined value showing a stable generation of electricity by the fuel cell stack, the method further comprises the steps of:

setting the current limit value to the calculated target current value if the calculated target current is smaller than the current limit value; and maintaining the current limit value if the calculated target current is larger than the current limit value.

* * * * *